United States Patent
Garcia et al.

(10) Patent No.: US 12,395,832 B2
(45) Date of Patent: Aug. 19, 2025

(54) METHODS AND DEVICES FOR NETWORK FUNCTION DISCOVERY IN COMMUNICATION NETWORK

(71) Applicant: Telefonaktiebolaget LM Ericsson (publ), Stockholm (SE)

(72) Inventors: Ana Orea Garcia, Madrid (ES); Jorge Garcia Llorente, Madrid (ES); Juan Manuel Fernandez Galmes, Madrid (ES); Qiang Liu, Shanghai (CN); Vlatko Bolt, Zagreb (HR); Wenliang Zhang, Shanghai (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 790 days.

(21) Appl. No.: 17/628,417

(22) PCT Filed: Jul. 26, 2019

(86) PCT No.: PCT/CN2019/098014
§ 371 (c)(1),
(2) Date: Jan. 19, 2022

(87) PCT Pub. No.: WO2021/016763
PCT Pub. Date: Feb. 4, 2021

(65) Prior Publication Data
US 2022/0248211 A1 Aug. 4, 2022

(51) Int. Cl.
*H04W 8/18* (2009.01)
*H04W 48/16* (2009.01)
(52) U.S. Cl.
CPC .......... *H04W 8/186* (2013.01); *H04W 48/16* (2013.01)

(58) Field of Classification Search
CPC ....... H04W 8/005; H04W 4/029; H04W 4/70; H04W 4/08; H04W 12/06; H04W 76/10;
(Continued)

(56) References Cited

U.S. PATENT DOCUMENTS

2014/0348089 A1 11/2014 Lv et al.
2016/0295496 A1 10/2016 Atarius et al.
(Continued)

FOREIGN PATENT DOCUMENTS

| CN | 105393565 A | 3/2016 |
|---|---|---|
| CN | 107409339 A | 11/2017 |

(Continued)

OTHER PUBLICATIONS

European Search Report dated Mar. 24, 2023 for Application No. 19939932.0, consisting of 13 pages.
(Continued)

*Primary Examiner* — Kwasi Karikari
(74) *Attorney, Agent, or Firm* — Weisberg I.P. Law, P.A.

(57) ABSTRACT

A method for network function discovery in a communication network is provided. The method includes receiving a discovery request from a first network function NF to request one or more NF instance of a first group type for a first subscriber. The discovery request may include a first group type identifier of the first group type. The method may further include determining one or more group identifier for one or more groups of NF instances managing the first subscriber. The one or more groups of NF instances are of the first group type and one or more other group types. The method may further include sending a discovery response to the first network function, including the one or more group identifiers and addressing information to reach the one or more groups of NF instances.

20 Claims, 6 Drawing Sheets

(58) Field of Classification Search
CPC ..... H04W 40/246; H04W 76/40; H04W 4/40; H04W 8/186; H04W 12/76

See application file for complete search history.

(56) References Cited

U.S. PATENT DOCUMENTS

| | | | |
|---|---|---|---|
| 2018/0227871 | A1 | 8/2018 | Singh et al. |
| 2020/0059761 | A1* | 2/2020 | Li .................. H04W 4/24 |
| 2020/0228936 | A1* | 7/2020 | Talebi Fard ........... H04W 4/08 |

FOREIGN PATENT DOCUMENTS

| | | |
|---|---|---|
| CN | 108632312 A | 10/2018 |
| CN | 109842906 A | 6/2019 |
| WO | 2019117940 A1 | 6/2019 |

OTHER PUBLICATIONS

3GPP TS 23.502 V16.1.1 3rd Generation Partnership Project; Technical Specification Group Services and System Aspects; Procedures for the 5G System; Stage 2 (Release 16); Jun. 2019, consisting of 495 pages.

3GPP TS 29.510 V16.0.0 3rd Generation Partnership Project; Technical Specification Group Core Network and Terminals; 5G System; Network Function Repository Services; Stage 3 (Release 16); Jun. 2019, consisting of 135 pages.

3GPP TR 23.742 V16.0.0 3rd Generation Partnership Project; Technical Specification Group Services and System Aspects; Study on Enhancements to the Service-Based Architecture (Release 16); Dec. 2018, consisting of 131 pages.

SA2: Analysis on UDM/AUSF Discovery (Agenda 6.5.4); NEC, Nokia, Ericsson; S2-186078; Jun. 2018, consisting of 8 pages.

International Search Report and Written Opinion dated Apr. 16, 2020 for International Application No. PCT/CN2019/098014 filed Jul. 26, 2019; consisting of 8 pages.

3GPP TS 29.510 V15.4.0; 3rd Generation Partnership Project; Technical Specification Group Core Network and Terminals; 5G System; Network Function Repository Services; Stage 3 (Release 15); Jun. 2019; consisting of 127 pages.

Chinese Office Action and English Summary dated Dec. 8, 2023 for Application No. 201980098806, consisting of 14 pages.

3GPP TS 23.501 V15.5.0; 3rd Generation Partnership Project; Technical Specification Group Services and System Aspects; System Architecture for the 5G System; Stage 2 (Release 15); Mar. 2019; consisting of 241 pages.

3GPP TS 23.502 V15.5.1; 3rd Generation Partnership Project; Technical Specification Group Services and System Aspects; Procedures for the 5G System; Stage 2 (Release 15); Apr. 2019; consisting of 354 pages.

3GPP TS 29.503 V15.4.0; 3rd Generation Partnership Project; Technical Specification Group Core Network and Terminals; 5G System; Unified Data Management Services; Stage 3 (Release 15); Jun. 2019; consisting of 194 pages.

3GPP TS 29.505 V15.4.0; 3rd Generation Partnership Project; Technical Specification Group Core Network and Terminals; 5G System; Usage of the Unified Data Repository services for Subscription Data; Stage 3 (Release 15); Jun. 2019; consisting of 114 pages.

* cited by examiner

METHODS AND DEVICES FOR NETWORK FUNCTION DISCOVERY IN COMMUNICATION NETWORK

CROSS-REFERENCE TO RELATED APPLICATION

This application is a Submission Under 35 U.S.C. § 371 for U.S. National Stage Patent Application of International Application Number: PCT/CN2019/098014, filed Jul. 26, 2019 entitled "METHODS AND DEVICES FOR NETWORK FUNCTION DISCOVERY IN COMMUNICATION NETWORK," the entirety of which is incorporated herein by reference.

TECHNICAL FIELD

The present disclosure generally relates to communication network, and more specifically to methods and devices for network function discovery in communication network.

BACKGROUND

In 5G specification, three types of grouping concepts are defined: External Group Identifier (ID), which is a group made up of one or more subscriptions associated to a group of subscribers; Internal Group ID, which is a global unique ID which identifies a set of users (e.g. Machine Type Communication (MTC) devices) from a given network that are grouped together for one specific group related service; Group ID: which refers to one or more Network Function (NF) instances managing a specific set of subscribers.

The Group ID can be used for subscriber partitioning and regionalization, so that there can be different groups of NF instances assigned to different types of subscribers or to subscribers whose data are stored in a particular region. Group ID is an important data to be considered in a discovery procedure for an appropriate NF instance.

In order to allow their discovery, NF instances register their Group ID and Routing ID (when applicable) in a Network Repository Function, NRF, and discovering NF instances use this information to select the right NF instance. Throughout this specification, the terms 'Routing ID' and 'routing identifier' are used indistinctly and, unless otherwise specified, for the same purpose and meaning as the term 'Routing Indicator' referred to in 3GPP TS 29.510 V15.4.0.

The Group ID is applicable to Authentication Server Function (AUSF), Unified Data Management (UDM) and User Data Repository (UDR), which are a sort of "storage" NF owning subscription data, and it is not mandated that a same Group ID is assigned to AUSF, UDM and UDR in a same network. For example, there could be one group of AUSFs and UDMs for mMTC (massive MTC) subscribers and another one for eMBB (enhanced Mobile Broadband) subscribers, while there could be one UDR group for subscribers in region 1 and another UDR group for subscribers in region 2, regardless they are mMTC or eMBB subscribers.

This grouping flexibility presents a number of drawbacks derived from the fact that the subscribers' identifiers represented by a Group Id may be of a different nature. For example, a Group Id may correspond to a set of Subscription Permanent Identifiers (SUPIs), or to a set of Subscription Concealed Identifiers (SUCIs) accompanied by different routing identifiers.

The only NF knowing how the different subscribers' identifiers (e.g. SUPI, SUCI or External Identity) are mapped to a specific Group Id, as well as how the routing identifiers are assigned to each NF instance, is NRF.

In this situation, all requests for a subscriber identifier require a corresponding discovery request towards NRF for each NF instance. Submission of so many requests, as well as the different grouping types based on different subscribers' identifiers, are drawbacks in network performance.

SUMMARY

It is an object of the present disclosure to address these drawbacks mentioned above, thereby improving the network performance.

According to a first aspect of the present disclosure, there is provided a method for network function discovery in a communication network. The method may comprise receiving a discovery request from a first network function (NF) to request one or more NF instance of a first group type for a first subscriber. The discovery request may include a first group type identifier of the first group type. The method may further comprise determining one or more group identifier for one or more groups of NF instances managing the first subscriber. The one or more groups of NF instances are of the first group type and one or more other group types. The method may further comprise sending a discovery response to the first network function, including the one or more group identifiers and addressing information to reach the one or more groups of NF instances.

According to a second aspect of the present disclosure, there is provided another method for network function discovery in a communication network. The method may comprise sending a discovery request to a network function repository function (NRF) to request one or more NF instance of a first group type for a first subscriber. The discovery request may include a first group type identifier of the first group type. The method may further comprise receiving a discovery response from the NRF, including one or more group identifiers for one or more groups of NF instances managing the first subscriber, and addressing information to reach the one or more groups of NF instances. The one or more groups of NF instances are of the first group type and one or more other group types.

According to a third aspect of the present disclosure, there is provided a network device in a communication network. The network device is communicatively coupled to another network device in the communication network. The network device may comprise a processor and a memory communicatively coupled to the processor. The memory may be adapted to store instructions which, when executed by the processor, cause the network device to perform steps of the method according to the above first aspect.

According to a fourth aspect of the present disclosure, there is provided a network device in a communication network. The network device is communicatively coupled to another network device in the communication network. The network device may comprise a processor and a memory communicatively coupled to the processor. The memory may be adapted to store instructions which, when executed by the processor, cause the network device to perform steps of the method according to the above second aspect.

According to the fifth aspect of the present disclosure, there is provided a non-transitory machine-readable medium having a computer program stored thereon. The computer program, when executed by a set of one or more processors of a network device, causes the network device to perform steps of the method according to the above first aspect or the above second aspect.

BRIEF DESCRIPTION OF THE DRAWINGS

The present disclosure may be best understood by way of example with reference to the following description and accompanying drawings that are used to illustrate embodiments of the present disclosure. In the drawings.

DETAILED DESCRIPTION

Figure 1:
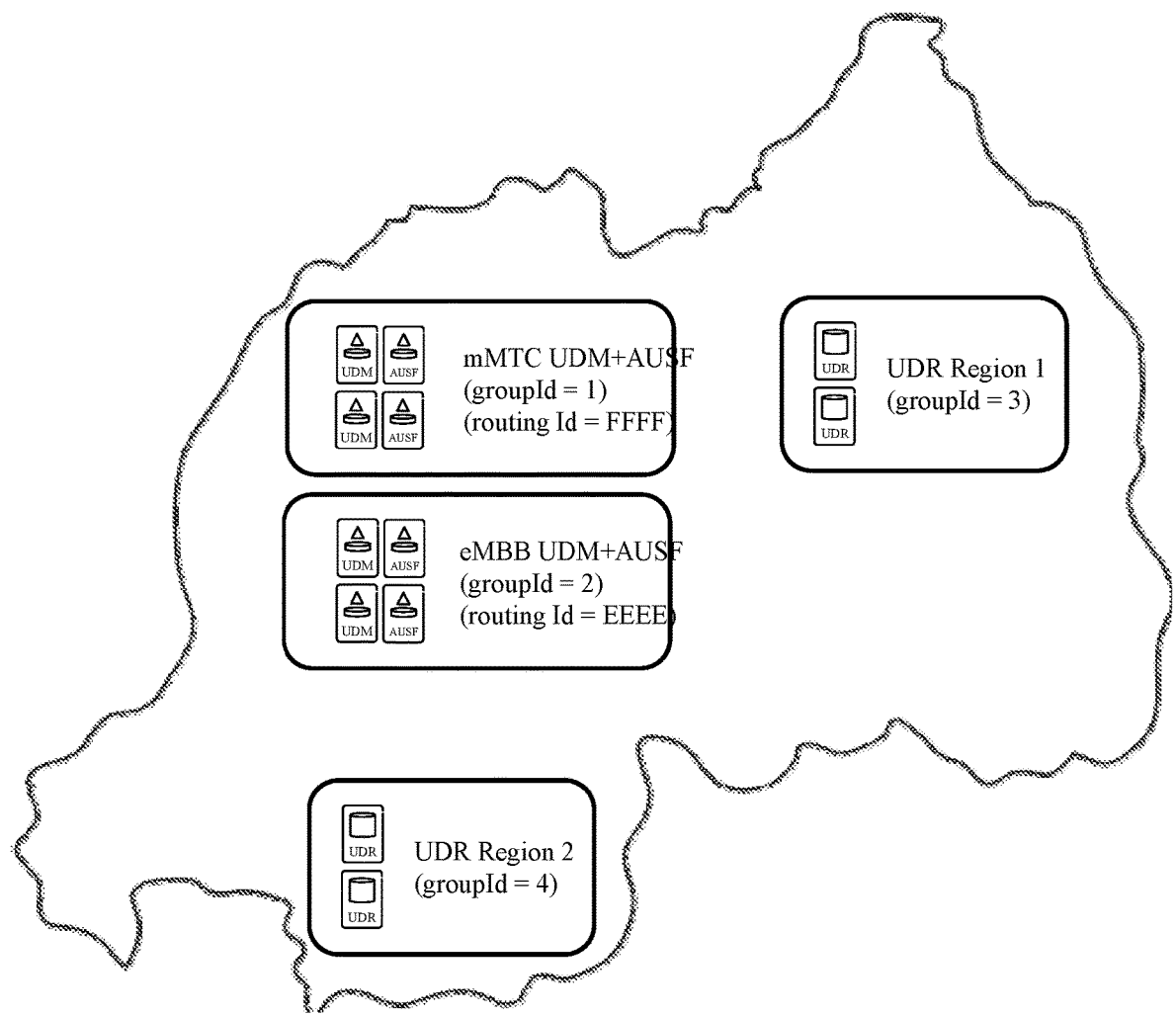
FIG. 1 is schematic diagram illustrating an example of different group type of NF.

The following detailed description describes methods and apparatuses for network function discovery in a communication network. In the following detailed description, numerous specific details such as logic implementations, types and interrelationships of system components, etc. are set forth in order to provide a more thorough understanding of the present disclosure. It should be appreciated, however, by one skilled in the art that the present disclosure may be practiced without such specific details. In other instances, control structures, circuits and instruction sequences have not been shown in detail in order not to obscure the present disclosure. Those of ordinary skill in the art, with the included descriptions, will be able to implement appropriate functionality without undue experimentation.

As used herein, the terms "first", "second" and so forth refer to different elements. The singular forms "a", "an", and "the" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "according to" is to be read as "at least in part according to". The term "one embodiment" and "an embodiment" are to be read as "at least one embodiment". The term "another embodiment" is to be read as "at least one other embodiment".

Unless otherwise defined, all terms (including technical and scientific terms) used herein have the same meanings as commonly understood. It will be further understood that a term used herein should be interpreted as having a meaning consistent with its meaning in the context of this specification and the relevant art and will not be interpreted in an idealized or overly formal sense unless expressly so defined herein.

Bracketed text and blocks with dashed borders (e.g., large dashes, small dashes, dot-dash, and dots) may be used herein to illustrate optional operations that add additional features to embodiments of the present disclosure. However, such notation should not be taken to mean that these are the only options or optional operations, and/or that blocks with solid borders are not optional in certain embodiments of the present disclosure.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on, that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of or one or more physical network interfaces to establish network connections (to transmit and/or receive code and/or data using propagating signals) with other electronic devices. One or more parts of an embodiment of the present disclosure may be implemented using different combinations of software, firmware, and/or hardware.

A network device is an electronic device that communicatively interconnects other electronic devices on the network (e.g., other network devices, end-user devices). Some network devices may be "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network function can be implemented either as a network element on a dedicated hardware, as a software instance running on a dedicated hardware, or as a virtualised function instantiated on an appropriate platform, e.g. on a cloud infrastructure. A network function may generally refer to UDM, UDR, AUSF, NRF, AMF, SMF, NEF, or other network functions in 5G core networks.

FIG. 1 is schematic diagram illustrating an example of different group type of NF. As shown in FIG. 1, there are different groups of NF handling different devices. For example, Group 1 is a group of UDMs and AUSFs managing mMTC, and Group 2 is a group of UDMs and AUSFs managing eMBB. In addition, there is one group of UDRs (Group 3) for subscribers in region 1 and another UDR group (Group 4) for subscribers in region 2, regardless they are mMTC or eMBB users, as it is shown in FIG. 1. It is also shown in FIG. 1, that different UDM/AUSF/UDRs will handle different sets of Subscription Concealed Identifiers (SUCI), one for the ones containing FFFF Routing ID and the others for the ones containing EEEE Routing ID. In order to facilitate the understanding of the flows we have assumed FFFF Routing ID is associated to mMTC subscribers and EEEE Routing ID is associated to eMBB subscribers, although there might not be a one-to-one mapping between routing id and group id in a real network.

This grouping flexibility presents a number of drawbacks derived from the fact that the subscribers' identifiers represented by a Group ID may be of a different nature, as already commented above. For example, a Group ID may correspond to a set of SUPIs, or to a set of SUCIs accompanied by different Routing IDs.

In this situation, e.g. AMF will discover the UDMs and their corresponding groups (group1 or group2) serving this subscriber, and e.g. UDM will discover the UDRs and their corresponding groups (group3 and group4).

The present specification provides a mechanism to reduce the number of requests towards NRF so that the association between subscriber identities and different types of grouping (UDR groups, routing ids, UDM groups and so on) is spread all along the network.

Figure 2:
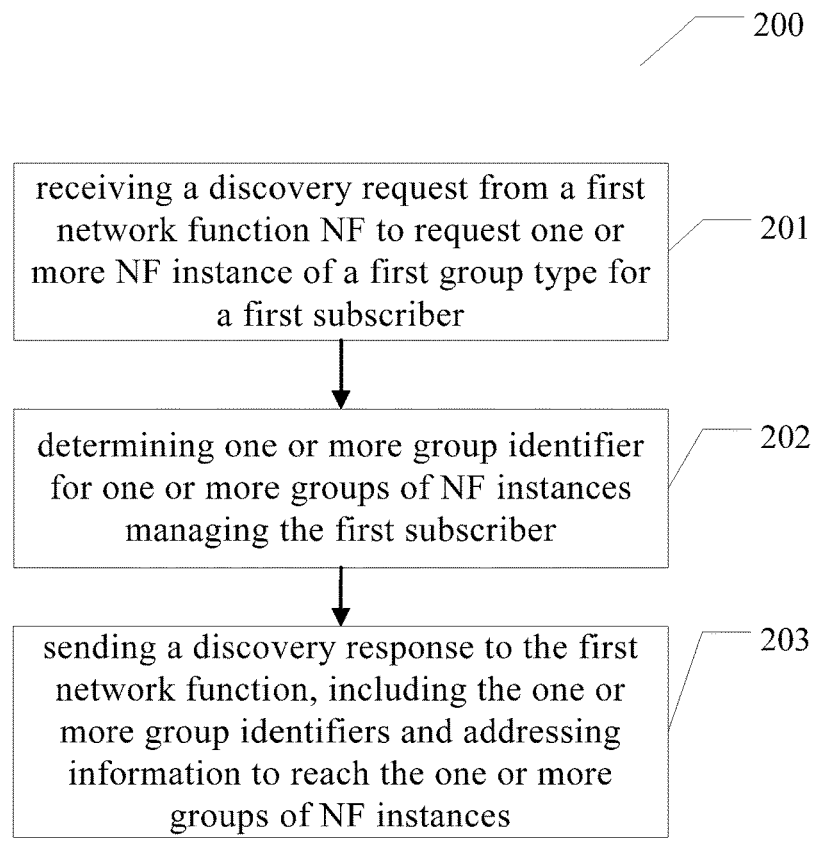
FIG. 2 is an exemplary flow diagram for a method for network function discovery implemented by a first network device, according to one or more embodiments of the present disclosure.

FIG. 2 schematically illustrates an exemplary flow diagram 200 for a method for network function discovery implemented by a first network device, according to one or more embodiments of the present disclosure.

Referring to FIG. 2, in step 201, a discovery request may be received from a first network function (NF) to request one or more NF instance of a first group type for a first subscriber. The discovery request may include a first group type identifier of the first group type. In step 202, one or more group identifier may be determined for one or more groups of NF instances managing the first subscriber. The one or more groups of NF instances are of the first group type and one or more other group types. As an example, a first subscriber identifier for the first subscriber may be received in the discovery request, and the one or more group identifier is determined based on the first subscriber identifier. As another example, a routing identifier associated with the first subscriber may be received in the discovery request, and the one or more group identifier may be determined based on the routing identifier. In step 203, a discovery response may be sent to the first network function, including the one or more group identifiers and addressing information to reach the one or more groups of NF instances. Advantageously, the discovery response may further include a routing identifier.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 3:
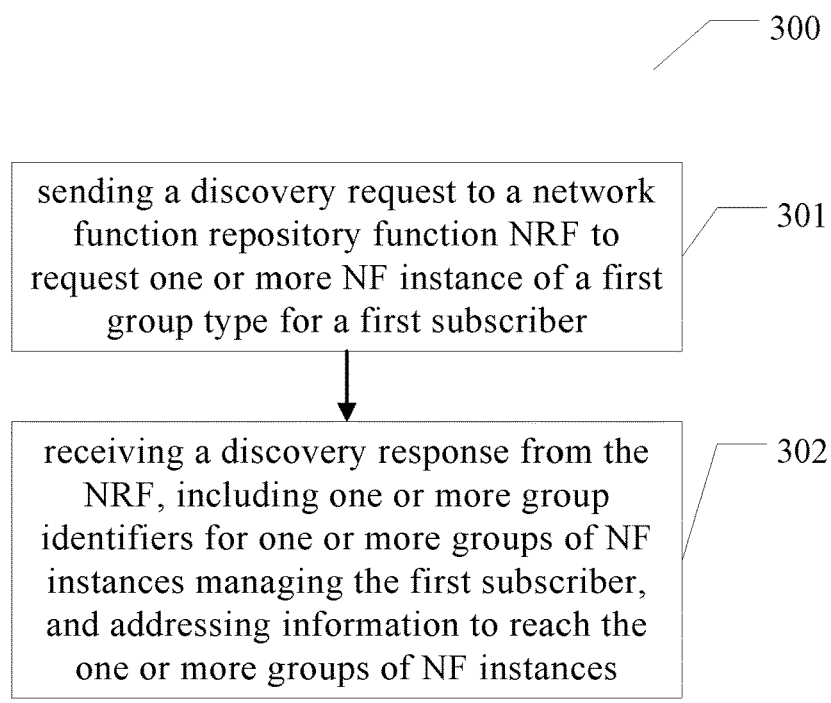
FIG. 3 is an exemplary flow diagram for a method for network function discovery implemented by a second network device, according to one or more embodiments of the present disclosure.

FIG. 3 schematically illustrates an exemplary flow diagram 300 for a method for network function discovery implemented by a second network device, according to one or more embodiments of the present disclosure.

Referring to FIG. 3, in step 301, a discovery request may be sent to a network function repository function (NRF) to request one or more NF instance of a first group type for a first subscriber. The discovery request may include a first group type identifier of the first group type. In step 302, a discovery response may be received from the NRF, including one or more group identifiers for one or more groups of NF instances managing the first subscriber, and addressing information to reach the one or more groups of NF instances. The one or more groups of NF instances are of the first group type and one or more other group types. As an example, a first subscriber identifier for the first subscriber may be sent in the discovery request to determine the one or more group identifier based on the first subscriber identifier. As another example, a routing identifier associated with the first subscriber may be sent in the discovery request to determine the one or more group identifier based on the routing identifier. Advantageously, the discovery response may further include a routing identifier.

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 4:
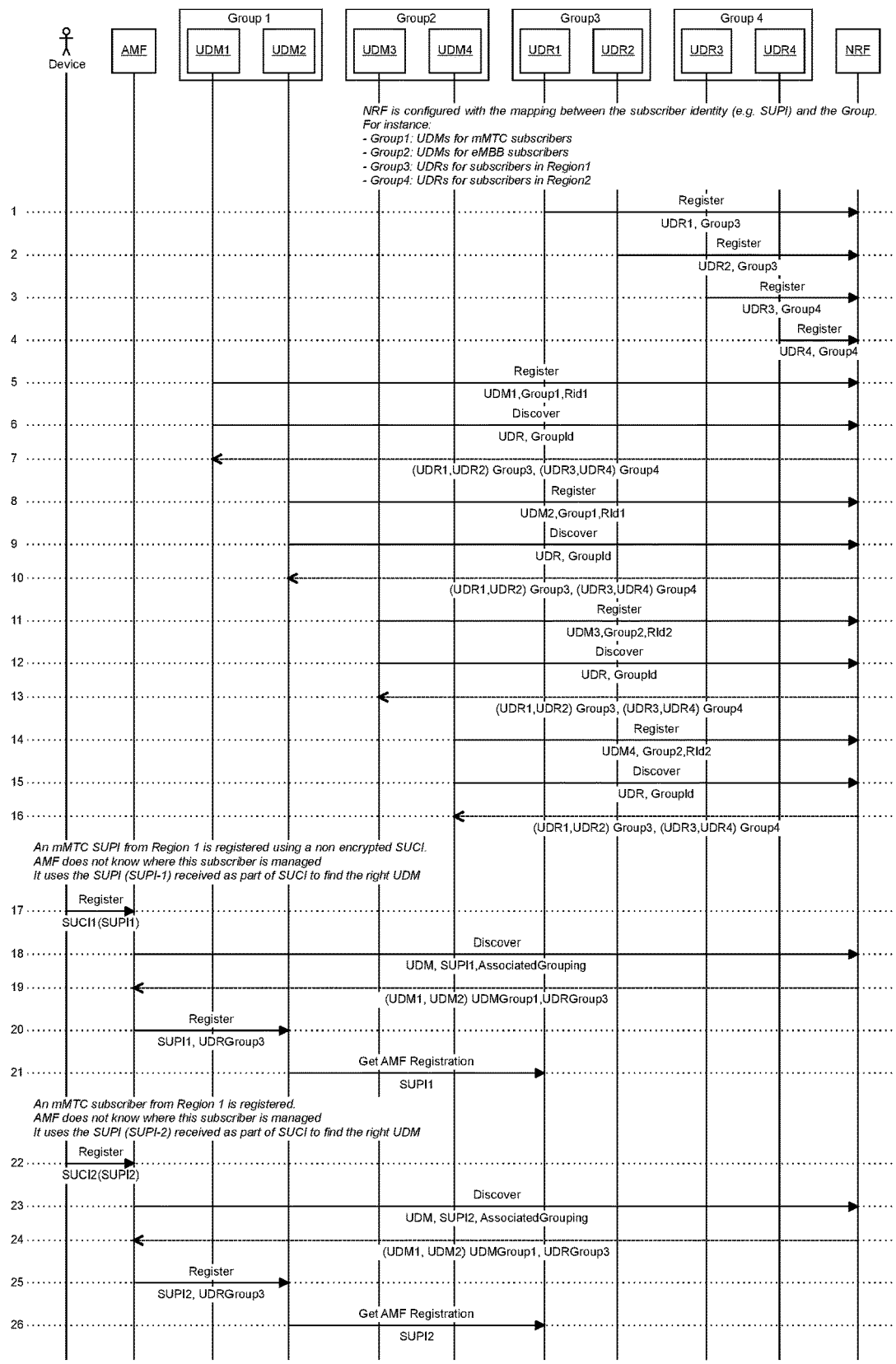
FIG. 4 is a flow chart illustrating an exemplary message exchange for network function discovery according to one or more embodiments of the present disclosure.

FIG. 4 is a flow chart illustrating an exemplary message exchange for network function discovery using non-encrypted SUCI, i.e. a clear SUPI, according to one or more embodiments of the present disclosure.

As shown in FIG. 4, NRF is configured with the association between a subscriber identifier (e.g. SUPI) and a Group ID. In an embodiment, for each subscriber of a plurality of subscribers, one or more group identifiers is stored for one or more groups of NF instances managing the subscriber, and, for each group identifier, a group type identifier of the group identifier and a routing identifier is stored. For instance, as illustrated in FIG. 1, Group 1 is a group of UDMs for mMTC subscribers, Group 2 is a group of UDMs for eMBB subscribers, Group 3 is a group of UDRs for subscribers in Region 1, and Group 4 is a group of UDRs for subscribers in Region 2. In step 1-4, each of the UDRs may register a NF identifier, and a group identifier for a group which the UDR belongs to. For instance, UDR 1 may register a UDR identifier, UDR1, and a group identifier, Group3, which means that UDR1 belongs to Group3; UDR 2 may register a UDR identifier, UDR2, and a group identifier, Group3, which means that UDR2 belongs to Group3; UDR 3 may register a UDR identifier, UDR3, and a group identifier, Group4, which means that UDR3 belongs to Group4; UDR 4 may register a UDR identifier, UDR4, and a group identifier, Group4, which means that UDR4 belongs to Group4. By this way, the NRF may know Group 3 includes UDR 1 and UDR 2, and Group 4 includes UDR 3 and UDR 4. Similarly, in step 5-16, each of the UDMs may register to the NRF, a NF identifier, a group identifier for a group which the UDM belongs to, and a Routing ID, and optionally, each UDM may discover the associated UDRs.

For example, UDM 1 may register a UDM identifier, UDM1, a group identifier, Groupl, and a Routing ID, Rid1, and send a discover request to the NRF, including a group type identifier UDR. The NRF may reply with a group identifier (Group3 and Group4) and the respective UDR identifiers in each group (UDR1, UDR2, UDR3, UDR4).

As shown in step 17, an mMTC subscriber from Region 1 is registering into the 5G network and contacts the corresponding AMF by sending the corresponding identity, such as SUCI. As an example, the SUCI may be not encrypted, so that the AMF can derive the SUPI (SUPI1) from the SUCI to find the corresponding UDM. In step 18, AMF may send a discovery request towards the NRF to request one or more UDM instances handling this subscriber. The discovery request may include a group type identifier, e.g. UDM, and the SUPI derived from the received SUCI for this subscriber. In addition, this discovery request may be also requesting other types of groups (e.g. UDR group in this embodiment) associated with this subscriber. NRF may know this subscriber is handled by Group1, and UDM 1 and UDM 2 are registered in Group1, as illustrated above. In step 19, the NRF may send a discovery response to the AMF, including the UDM group identifier (Group1), and the UDM addresses for UDM 1 and UDM 2, and other types of groups, such as UDR Group3. As an alternative, the discovery response may also include the UDR identifiers in the UDR Group3 and their respective addresses. In step 20, the AMF may select a UDM (UDM 2 in this embodiment) and send a query to UDM 2, including the UDR group identifier this subscriber is associated to (UDR Group3), to inform the UDM which UDR group the UDM may contact. In step 21, the UDM may select one UDR from the UDR Group3 without additional requests to the NRF.

The messages discussed herein are merely examples for the disclosure, will not limit the scope of the disclosure. The skilled person in the art may employ different types of messages to implement the method without depart from the scope of the disclosure. The NF types discussed herein are merely examples for this disclosure, and will not limit the scope of this disclosure. The inventive method may be applicable to other types of NFs, such as UDM, UDR, AUSF, NRF, AMF, SMF, NEF, or other network functions in 5G core networks. When discovery towards NRF is done based on a subscriber identity, all possible groups associated to this subscriber may be included. Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 5:
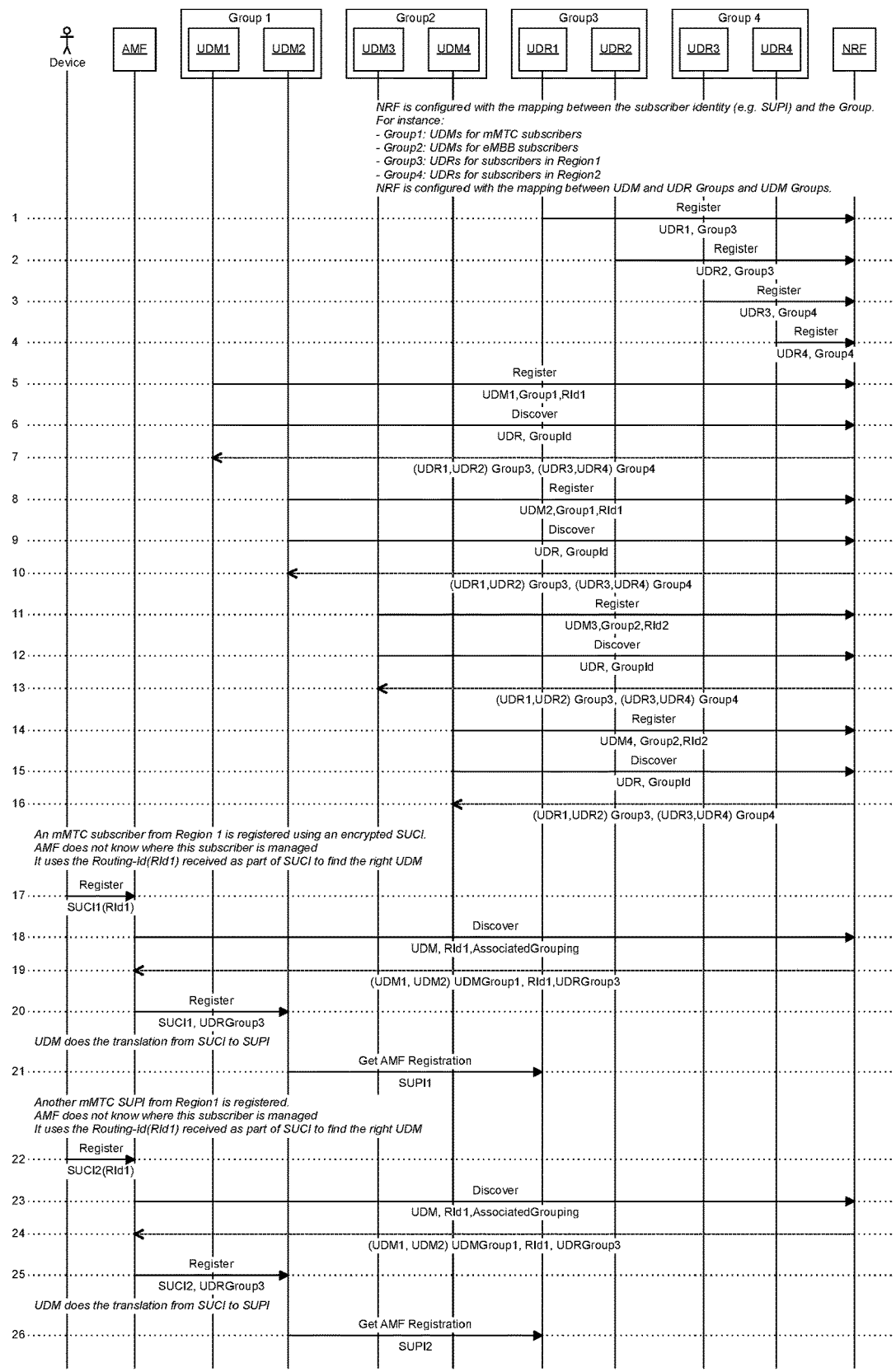
FIG. 5 is a flow chart illustrating another exemplary message exchange for network function discovery according to one or more embodiments of the present disclosure.

FIG. 5 is a flow chart illustrating an exemplary message exchange for network function discovery using an encrypted SUCI, according to one or more embodiments of the present disclosure.

As shown in FIG. 5, NRF is configured with the association between a subscriber identifier (e.g. SUPI) and a Group ID. In an embodiment, for each subscriber of a plurality of subscribers, one or more group identifiers is stored for one or more groups of NF instances managing the subscriber, and, for each group identifier, a group type identifier of the group identifier and a routing identifier is stored. For instance, as illustrated in FIG. 1, Group 1 is a group of UDMs for mMTC subscribers, Group 2 is a group of UDMs for eMBB subscribers, Group 3 is a group of UDRs for subscribers in Region 1, and Group 4 is a group of UDRs for subscribers in Region 2. In step 1-4, each of the UDRs may register a NF identifier, and a group identifier for a group which the UDR belongs to. For instance, UDR 1 may register a UDR identifier, UDR1, and a group identifier, Group3, which means that UDR1 belongs to Group3; UDR 2 may register a UDR identifier, UDR2, and a group identifier, Group3, which means that UDR2 belongs to Group3; UDR 3 may register a UDR identifier, UDR3, and a group identifier, Group4, which means that UDR3 belongs to Group4; UDR 4 may register a UDR identifier, UDR4, and a group identifier, Group4, which means that UDR4 belongs to Group4. By this way, the NRF may know Group 3 includes UDR 1 and UDR 2, and Group 4 includes UDR 3 and UDR 4. Similarly, in step 5-16, each of the UDMs may register to the NRF, a NF identifier, a group identifier for a group which the UDM belongs to, and a Routing ID, and optionally, each UDM may discover the associated UDRs. For example, UDM 1 may register a UDM identifier, UDM1, a group identifier, Group1, and a Routing ID, Rid1, and send a discover request to the NRF, including a group type identifier UDR. The NRF may reply with a group identifier (Group3 and Group4) and the respective UDR identifiers in each group (UDR1, UDR2, UDR3, UDR4).

As shown in step 17, an mMTC subscriber from Region 1 is registering into the 5G network and contacts the corresponding AMF by sending the corresponding identity, such as SUCI. As an example, the SUCI may be encrypted, so the AMF cannot derive the SUPI from the SUCI, the AMF may use the Routing ID received as part of the SUCI to find the corresponding UDM. In step 18, AMF may send a discovery request towards the NRF to request one or more UDM instances handling this subscriber. The discovery request may include a group type identifier, e.g. UDM, and the Routing ID received in the SUCI for this subscriber. In addition, this discovery request may be also requesting other types of groups (e.g. UDR group in this embodiment) associated with this subscriber. NRF may know this subscriber is handled by Group1, and UDM 1 and UDM 2 are registered in Group1, as illustrated above. In step 19, the NRF may send a discovery response to the AMF, including the UDM group identifier (Group1), and the UDM addresses for UDM 1 and UDM 2, and other types of groups, such as UDR Group3. As an alternative, the discovery response may also include the UDR identifiers in the UDR Group3 and their respective addresses. The discovery response may further include the Routing ID received in the SUCI. In step 20, the AMF may select a UDM (UDM 2 in this embodiment) and send a query to UDM 2, including the UDR group identifier this subscriber is associated to (UDR Group3), to inform the UDM which UDR group the UDM may contact. In step 21, the UDM may select one UDR from the UDR Group3 without additional requests to the NRF.

The messages discussed herein are merely examples for the disclosure, will not limit the scope of the disclosure. The skilled person in the art may employ different types of messages to implement the method without depart from the scope of the disclosure. The NF types discussed herein are merely examples for this disclosure, and will not limit the scope of this disclosure. The inventive method may be applicable to other types of NFs, such as UDM, UDR, AUSF, NRF, AMF, SMF, NEF, or other network functions in 5G core networks. When discovery towards NRF is done based on a subscriber identity, all possible groups associated to this subscriber may be included. Although the method discussed herein is applied to registration procedure, i.e. when an mMTC registers to a 5G network, as illustrated above, the method may be applicable to any other 5G Core procedures requesting to discover other NFs, such as authentication procedures, session establishment procedures, subscription or notification for specific network events, and so on. Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps may be executed, at least partially, in parallel. A given step may not have finished completely before a next step is started. Moreover, fewer than all the illustrated steps may be required to implement an example methodology. Steps may be combined or separated into multiple sub-steps. Furthermore, additional or alternative methodologies can employ additional, not illustrated steps.

Figure 6:
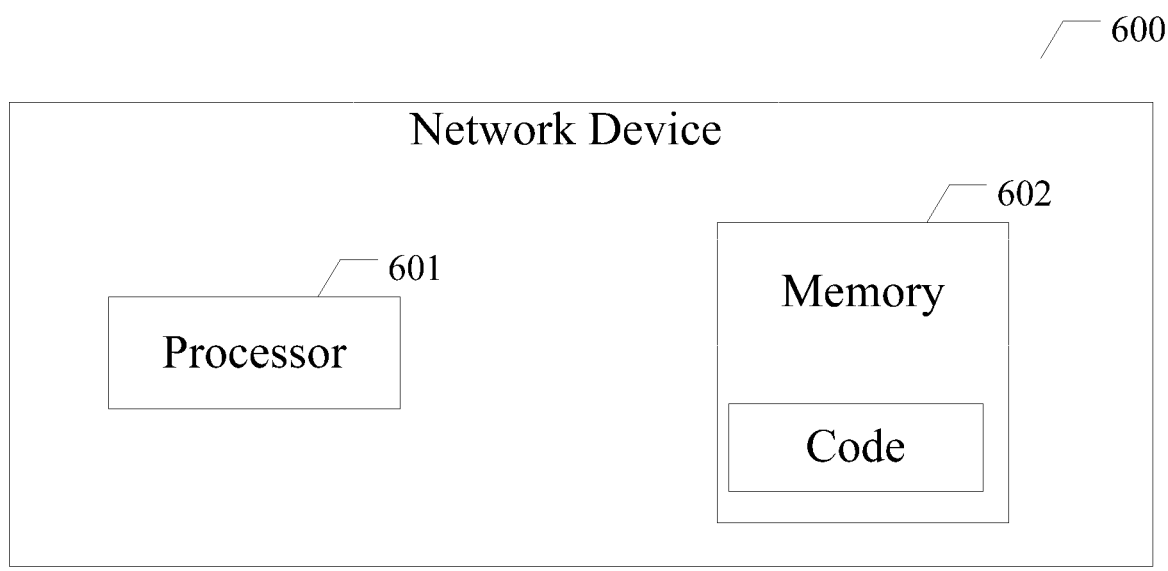
FIG. 6 is a block diagram illustrating a network device according to some embodiments of the present disclosure.

FIG. 6 is a block diagram illustrating a network device 600 according to some embodiments of the present disclosure. It should be appreciated that the network device 600 may be implemented using components other than those illustrated in FIG. 6.

With reference to FIG. 6, the network device 600 may comprise at least a processor 601, a memory 602, an interface and a communication medium. The processor 601, the memory 602 and the interface are communicatively coupled to each other via the communication medium.

The processor 601 includes one or more processing units. A processing unit may be a physical device or article of manufacture comprising one or more integrated circuits that read data and instructions from computer readable media, such as the memory 602, and selectively execute the instructions. In various embodiments, the processor 601 is implemented in various ways. As an example, the processor 601 may be implemented as one or more processing cores. As another example, the processor 601 may comprise one or more separate microprocessors. In yet another example, the processor 601 may comprise an application-specific integrated circuit (ASIC) that provides specific functionality. In yet another example, the processor 601 provides specific functionality by using an ASIC and by executing computer-executable instructions.

The memory 602 includes one or more computer-usable or computer-readable storage medium capable of storing data and/or computer-executable instructions. It should be appreciated that the storage medium is preferably a non-transitory storage medium.

The communication medium facilitates communication among the processor 601, the memory 602 and the interface. The communication medium may be implemented in various ways. For example, the communication medium may comprise a Peripheral Component Interconnect (PCI) bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing System Interface (SCSI) interface, or another type of communications medium. The interface could be coupled to the processor. Information and data as described above in connection with the methods may be sent via the interface.

In the example of FIG. 6, the instructions stored in the memory 602 may include those that, when executed by the processor 601, cause the network device 600 to implement the methods described with respect to FIGS. 2, 4, and 5.

Figure 7:
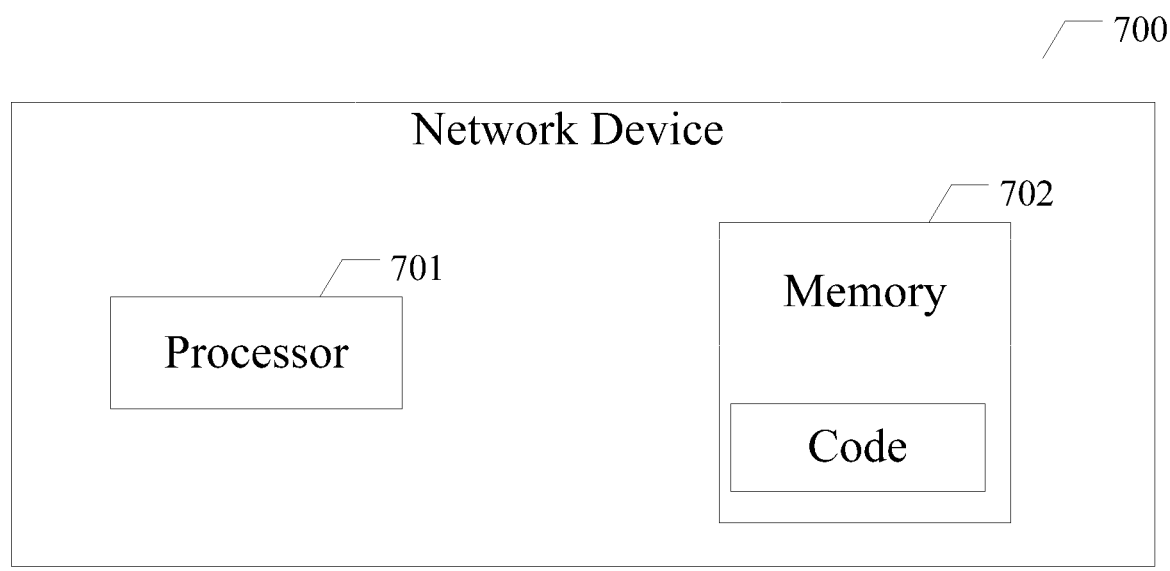
FIG. 7 is a block diagram illustrating a network device according to some embodiments of the present disclosure.

FIG. 7 is a block diagram illustrating a network device 700 according to some embodiments of the present disclosure. It should be appreciated that the network device 700 may be implemented using components other than those illustrated in FIG. 7.

With reference to FIG. 7, the network device 700 may comprise at least a processor 701, a memory 702, an interface and a communication medium. The processor 701, the memory 702 and the interface are communicatively coupled to each other via the communication medium.

The processor 701, the memory 702, the interface and the communication medium are structurally and functionally similar to the processor 601, the memory 602, the interface and the communication medium respectively, and will not be described herein in detail.

In the example of FIG. 7, the instructions stored in the memory 702 may include those that, when executed by the processor 701, cause the network device 700 to implement the method described with respect to FIG. 3-5.

Some portions of the foregoing detailed description have been presented in terms of algorithms and symbolic representations of transactions on data bits within a computer memory. These algorithmic descriptions and representations are ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be appreciated, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to actions and processes of a computer system, or a similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present disclosure are not described with reference to any particular programming language. It should be appreciated that a variety of programming languages may be used to implement the teachings of embodiments of the present disclosure as described herein.

An embodiment of the present disclosure may be an article of manufacture in which a non-transitory machine-readable medium (such as microelectronic memory) has stored thereon instructions (e.g., computer code) which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

In the foregoing detailed description, embodiments of the present disclosure have been described with reference to specific exemplary embodiments thereof. It will be evident that various modifications may be made thereto without departing from the scope of the present disclosure as set forth in the following claims. The specification and drawings are, accordingly, to be regarded in an illustrative sense rather than a restrictive sense.

Throughout the description, some embodiments of the present disclosure have been presented through flow diagrams. It should be appreciated that the order of transactions and transactions described in these flow diagrams are only intended for illustrative purposes and not intended as a limitation of the present disclosure. One having ordinary skill in the art would recognize that variations can be made to the flow diagrams without departing from the scope of the present disclosure as set forth in the following claims.

The invention claimed is:

1. A method for network function discovery in a communication network, the method comprising:
receiving a discovery request from a first network function, NF, to request one or more NF instance of a first group type for a first subscriber, the discovery request including a first group type identifier of the first group type;
determining one or more group identifier for one or more groups of NF instances managing the first subscriber, the one or more groups of NF instances being of the first group type and one or more other group types, the one or more group identifier mapping to a subscriber identity configured in a network repository function, NRF, each of the one or more groups being associated with a service type for a type of subscriber; and
sending a discovery response to the first network function, the discovery response including the one or more group identifiers and a respective user data repository, UDR, and addressing information to reach the one or more groups of NF instances.

2. The method of claim 1, further comprising:
receiving a first subscriber identifier for the first subscriber in the discovery request; and
determining the one or more group identifier based on the first subscriber identifier.

3. The method of claim 1, further comprising:
receiving a routing identifier associated with the first subscriber in the discovery request; and
determining the one or more group identifier based on the routing identifier.

4. The method of claim 2, further comprising:
registering from a second network function of a second group type with a NF identifier, and a group identifier for a group which the second network function belongs to.

5. The method of claim 3, further comprising:
registering from a third network function of a third group type with a NF identifier, a group identifier for a group which the third network function belongs to, and a routing identifier.

6. The method of claim 1, further comprising:
storing, for each subscriber of a plurality of subscribers, one or more group identifiers for one or more groups of NF instances managing the subscriber, and, for each group identifier, a group type identifier of the group identifier and a routing identifier.

7. The method of claim 1, wherein the discovery response includes a routing identifier.

8. The method of claim 2, further comprising:
storing, for each subscriber of a plurality of subscribers, one or more group identifiers for one or more groups of NF instances managing the subscriber, and, for each group identifier, a group type identifier of the group identifier and a routing identifier.

9. The method of claim 2, wherein the discovery response includes a routing identifier.

10. The method of claim 3, further comprising:
storing, for each subscriber of a plurality of subscribers, one or more group identifiers for one or more groups of NF instances managing the subscriber, and, for each group identifier, a group type identifier of the group identifier and a routing identifier.

11. The method of claim 3, wherein the discovery response includes a routing identifier.

12. The method of claim 4, further comprising:
storing, for each subscriber of a plurality of subscribers, one or more group identifiers for one or more groups of NF instances managing the subscriber, and, for each group identifier, a group type identifier of the group identifier and a routing identifier.

13. The method of claim 4, wherein the discovery response includes a routing identifier.

14. A method for network function discovery in a communication network, the method comprising:
sending a discovery request to a network function repository function, NRF, to request one or more network function, NF, instance of a first group type for a first subscriber, the discovery request including a first group type identifier of the first group type; and
receiving a discovery response from the NRF, the discovery response including one or more group identifiers for one or more groups of NF instances managing the first subscriber and a respective user data repository, UDR, and addressing information to reach the one or more groups of NF instances, the one or more groups of NF instances are of the first group type and one or more other group types, the one or more group identifiers mapping to a subscriber identity configured in the NRF, each of the one or more groups being associated with a service type for a type of subscriber.

15. The method of claim 14, further comprising:
sending a first subscriber identifier for the first subscriber in the discovery request to determine the one or more group identifier based on the first subscriber identifier.

16. The method of claim 14, further comprising:
sending a routing identifier associated with the first subscriber in the discovery request to determine the one or more group identifier based on the routing identifier.

17. The method of claim 14, further comprising:
sending a query to a NF instance of the first group type, the query including a group type identifier for a second group type associated with the first group type.

18. The method of claim 14, wherein the discovery response includes a routing identifier.

19. A network device in a communication network, comprising:
a processor; and
a memory communicatively coupled to the processor and adapted to store instructions which, when executed by the processor, cause the network device to:
receive a discovery request from a first network function, NF, to request one or more NF instance of a first group type for a first subscriber, the discovery request including a first group type identifier of the first group type;
determine one or more group identifier for one or more groups of NF instances managing the first subscriber, the one or more groups of NF instances being of the first group type and one or more other group types, the one or more group identifier mapping to a subscriber identity configured in a network repository function, NRF, each of the one or more groups being associated with a service type for a type of subscriber; and
send a discovery response to the first network function, the discovery response including the one or more group identifiers and a respective user data repository, UDR, and addressing information to reach the one or more groups of NF instances.

20. A network device in a communication network, comprising:
a processor; and
a memory communicatively coupled to the processor and adapted to store instructions which, when executed by the processor, cause the network device to:
send a discovery request to a network function repository function, NRF, to request one or more network function, NF, instance of a first group type for a first subscriber, the discovery request including a first group type identifier of the first group type; and
receive a discovery response from the NRF, the discovery response including one or more group identifiers for one or more groups of NF instances managing the first subscriber and a respective user data repository, UDR, and addressing information to reach the one or more groups of NF instances, the one or more groups of NF instances are of the first group type and one or more other group types, the one or more group identifiers mapping to a subscriber identity configured in the NRF, each of the one or more groups being associated with a service type for a type of subscriber.

* * * * *